United States Patent
Cioffi et al.

(10) Patent No.: US 7,606,350 B2
(45) Date of Patent: Oct. 20, 2009

(54) INCENTIVE-BASED DSL SYSTEM

(75) Inventors: John M. Cioffi, Atherton, CA (US); Wonjong Rhee, Palo Alto, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 973 days.

(21) Appl. No.: 11/122,428

(22) Filed: May 5, 2005

(65) Prior Publication Data

US 2005/0271075 A1 Dec. 8, 2005

Related U.S. Application Data

(60) Provisional application No. 60/572,051, filed on May 18, 2004.

(51) Int. Cl.
H04M 1/24 (2006.01)
H04M 3/08 (2006.01)
H04M 3/22 (2006.01)

(52) U.S. Cl. ............... 379/1.03; 379/1.04; 370/252; 375/225; 375/240; 375/240.05

(58) Field of Classification Search ............ 379/1.01, 379/1.03, 1.04, 9, 10.01, 15.01, 27.01, 28, 379/29.01, 32.01, 32.04; 370/235, 252, 445, 370/468, 241, 241.1, 248, 250, 253; 375/222, 375/225, 228, 240, 240.08, 240.02, 240.12

See application file for complete search history.

(56) References Cited

U.S. PATENT DOCUMENTS 5,673,290 A 9/1997 Cioffi et al.

(Continued)

FOREIGN PATENT DOCUMENTS

EP 1283655 A1 2/2003

OTHER PUBLICATIONS

Cioffi, John M., "Incentive-Based Spectrum Management", (Aug. 8, 2004).

(Continued)

*Primary Examiner*—Binh K Tieu
(74) *Attorney, Agent, or Firm*—Blakely Sokoloff Taylor & Zafman LLP

(57) ABSTRACT

Improved DSL and/or other communication system services can be provided by motivating users, service providers and operators to implement and comply with one or more operational conditions, such as parameter value limits and/or ranges, that enhance operation of the communication system. Enhanced operation can include providing a reward such as an operational benefit to one or more users and/or mitigating problems experienced by other users in the communication system, which can be one or more communication lines. A DSL line implementing and complying with one or more operational conditions is provided with a reward (such as an operational benefit like a higher maximum data rate), which is otherwise withheld if the line fails to comply with the condition(s). Each operational condition may be set and monitored by a controller, such as a DSL optimizer that collects and analyzes operational data to determine compliance. Other requirements may be imposed for a DSL line to be eligible for the reward, such as the requiring the DSL line to provide operational data to the controller and requiring the DSL line's acceptance of control signals from the controller. The controller can use the operational data and line control to enhance system operation, for example to reduce crosstalk between lines in a common binder.

29 Claims, 7 Drawing Sheets

U.S. PATENT DOCUMENTS

| | | | |
|---|---|---|---|
| 6,947,441 B1 | 9/2005 | Milbrandt | |
| 2005/0186933 A1* | 8/2005 | Trans | 455/296 |
| 2005/0237940 A1* | 10/2005 | Tennyson | 370/235 |
| 2007/0286084 A1* | 12/2007 | Magnone et al. | 370/241 |
| 2008/0095188 A1* | 4/2008 | Remy et al. | 370/468 |

OTHER PUBLICATIONS

International Search Report, International Application No. PCT/IB2005/001557 (4 pgs).

Written Opinion of the International Searching Authority, International Application No. PCT/IB2005/001557 (13 pgs).

* cited by examiner

INCENTIVE-BASED DSL SYSTEM

CROSS-REFERENCE TO RELATED APPLICATIONS

This application claims the benefit of priority under 35 U.S.C. § 119(e) of U.S. Provisional No. 60/572,051 filed on May 18, 2004, entitled DYNAMIC MANAGEMENT OF COMMUNICATION SYSTEM, the disclosure of which is incorporated herein by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems. More specifically, this invention relates to collecting operational data from modems and/or other components in a communication system, such as a DSL system or the like, and controlling operation of the communication system. Even more specifically, at least one embodiment of this invention includes methods and apparatus for controlling performance of a DSL system by "incentivizing" users' compliance with one or more operational conditions and/or values.

2. Description of Related Art

Digital subscriber line (DSL) technologies provide potentially large bandwidth for digital communication over existing telephone subscriber lines (referred to as loops and/or the copper plant). In particular, asymmetric DSL (ADSL) and very high bit-rate DSL (VDSL) can adjust to the characteristics of the subscriber line by using a discrete multitone (DMT) line code that assigns a number of bits to each tone (or subcarrier), which can be adjusted to channel conditions as determined (for example, during training and initialization of the modems, which typically are transceivers that function as both transmitters and receivers at each end of the subscriber line).

Currently, nationwide fixed swaths of frequency have been assigned for DSL systems, establishing static management rules governing spectra use based on worst-case, generally inapplicable transmission situations. Unreasonable static limits on and practices in DSL operation have frustrated efforts to improve service to users and to increase profitability and ubiquity for operators. Current static spectrum management attempts to ensure compatibility based on postulated, assumed and sometimes contrived binder situations. Associated with any such system is an implied probability of a given situation's occurrence. For example, crosstalk, which increases with wider spectrum use and thus higher data rates, dominates the achievable performance of DSL systems. Crosstalk models used in American National Standard T1.417-2003, "Spectrum Management for Loop Transmission Systems," Sep. 3, 2003, American National Standards Institute, are based on 1% worst-case coupling functions, also necessarily implying a probability of occurrence. Margins, which typically are targeted for 6 dB for DSL systems, are meant to protect against certain probable or improbable changes in line conditions. There also are probabilities of certain line lengths, presence of bridged taps, impulse noise, radio noise and other impairments. All these factors have been combined to generate a set of mandated spectrum masks or an equivalent set of calculated tests (called "Method B" and appearing in Annex A of T1.417-2003) for new communication technologies in trying to keep the probability of incompatibility below some threshold.

Higher speeds and more reliable communication-system operation enable more services, video, switched video, multiline telephony, file-sharing, resource and database sharing, which all can enhance DSL service for users and provide new services/products for operators to offer those users. To the extent that a reasonable probability of disruption can be maintained (or reduced) as speeds increase, then users and operators all benefit.

Systems, methods and techniques that motivate users and/or operators to operate DSL systems using reasonable parameters and practices, without disrupting normal operation of the DSL system, would represent a significant advancement in the art. Also, systems, methods and techniques that permit a DSL system controller such as a DSL optimizer to monitor, adjust and enforce various incentivizing practices and measures with system components likewise would represent a significant advancement in the art. More specifically, systems, methods and techniques that enable such a controller to mitigate the problems caused by users and operators who refuse to implement reasonable limits on DSL or other communication system resources and/or who insist on engaging in practices that impair other users' use and access to such a communication system also would represent a significant advancement in the art.

BRIEF SUMMARY

Methods, apparatus and computer program products provide improved DSL and/or other communication system services by motivating users, service providers and operators to implement and comply with one or more operational conditions, such as parameter value limits and/or ranges, that enhance operation of the communication system. Enhanced operation can include providing a reward such as an operational benefit to one or more users and/or mitigating problems experienced by other users in the communication system, which can be a single communication line, a plurality of communication lines, a binder of lines, a cable of lines, all the lines of a single service provider, and/or all the communication lines in a given region.

Using the present invention in xDSL systems, when a DSL line implements and complies with one or more operational conditions, that DSL line is provided with a reward (such as an operational benefit like a higher maximum data rate), which is otherwise withheld if the line fails to comply with the condition(s). Each operational condition may be set and monitored by a controller, such as a DSL optimizer. Other requirements may be imposed for a DSL line to be eligible for the reward, such as the requiring the DSL line to provide operational data to the controller and requiring the DSL line's acceptance of control signals from the controller. The controller can use the operational data and line control to enhance system operation, for example to reduce crosstalk between lines in a common binder.

A controller may be a computer-implemented device having a means for collecting operational data and means for analyzing the collected operational data to determine whether a given communication system is in compliance with the operational condition(s). Computer program products can implement the methods of the present invention.

Further details and advantages of the invention are provided in the following Detailed Description and the associated Figures.

BRIEF DESCRIPTION OF THE SEVERAL VIEWS OF THE DRAWINGS

The present invention will be readily understood by the following detailed description in conjunction with the accompanying drawings, wherein like reference numerals designate like structural elements, and in which.

DETAILED DESCRIPTION

Figure 1:
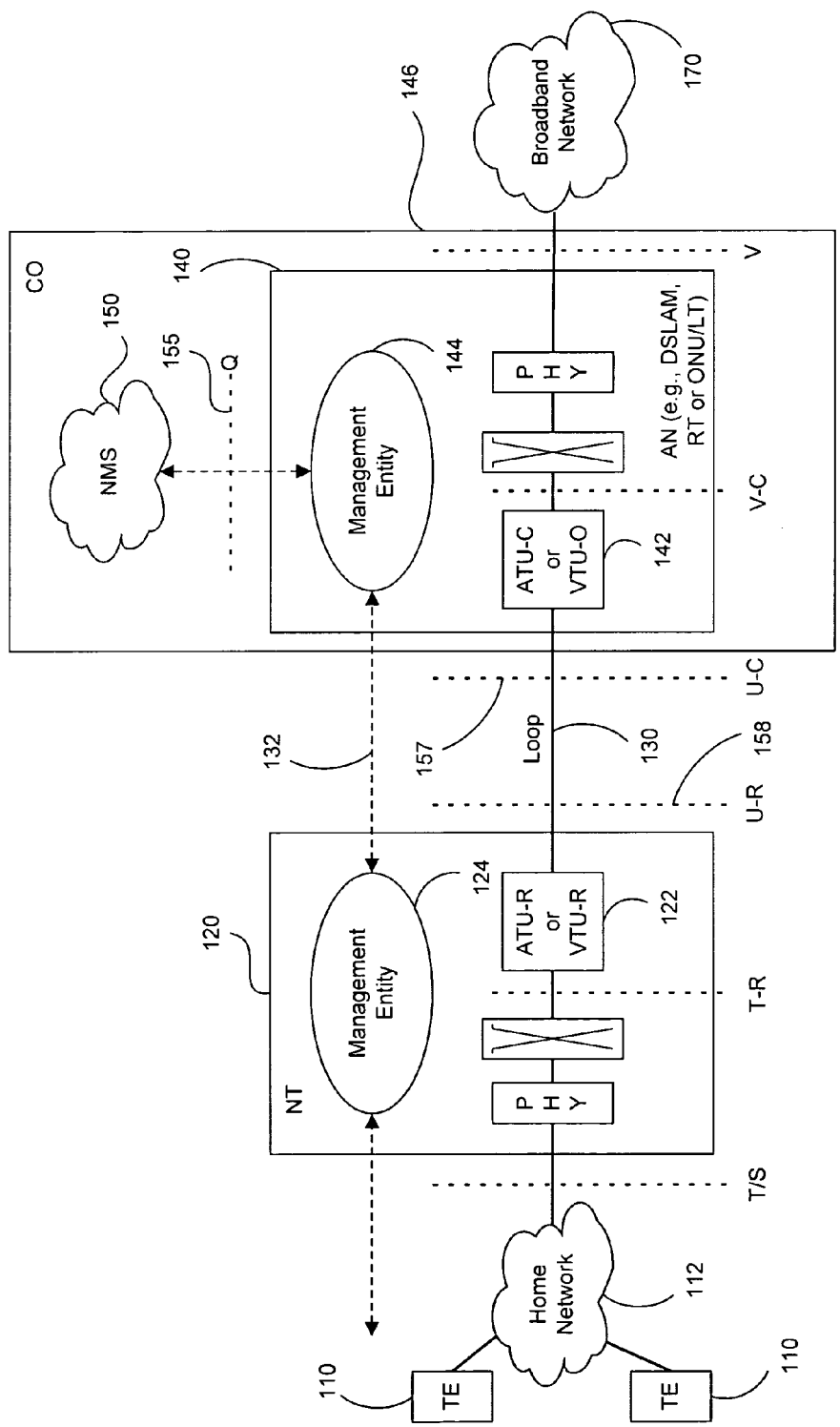
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention utilize dynamic spectrum management (DSM) principles to provide improved DSL and/or other communication system services by motivating users and operators to implement and comply with one or more operational conditions, such as parameter value limits and/or ranges, that enhance operation of the communication system. Enhanced operation may mean benefiting one or more users and/or mitigating problems experienced by other users in the same binder or in any other situation in which the operational behavior of one party affects the operational characteristics of other users. Using the present invention in xDSL systems, and especially ADSL and VDSL systems for example, when a DSL line implements and complies with one or more operational conditions, that DSL line is provided with a reward (such as an operational benefit like a higher maximum data rate), which is otherwise withheld if the line fails to comply with the condition(s). Each operational condition may be set and monitored by a controller, such as a DSL optimizer. Other requirements may be imposed for a DSL line to be eligible for the reward, such as the requiring the DSL line to provide operational data to the controller and requiring the DSL line's acceptance of control signals from the controller. The controller can use the operational data and line control to enhance system operation, for example to reduce crosstalk between lines in a common binder.

More specifically, the operational benefit in some embodiments may be related to maximum data rates available to a communication line. For example, a given maximum rate $R_{NC}$ may demarcate the boundary between line compliance and non-compliance. In such an embodiment, when a line complies with the operational condition(s), the line may operate above $R_{NC}$, while lines not complying with the operational condition cannot employ a data rate above $R_{NC}$. The operational condition may be one or more operational parameter values such as a maximum margin limit for a DSL line transmitting data in a DSL system. When line operation exceeds the operational condition value set for the maximum margin level (for example, as measured by the MAXSNRM parameter in ADSL1 and ADSL2 systems), the line is restricted to data rates no higher than $R_{NC}$. Users operating at or below the operational condition value for the maximum margin level are allowed to transmit at data rates above $R_{NC}$. As will be appreciated by those skilled in the art, operational rewards other than a maximum data rate and operational conditions other than those related to a maximum margin limit may also be employed according to the present invention.

In specific embodiments of the present invention, a controller (such as a DSL optimizer and/or dynamic spectrum manager) sets an operational condition for a DSL line. The controller collects operational data that allow the controller to monitor the line's compliance with the operational condition. When the line fails to comply with the condition, the controller withholds or prevents implementation of the operational or performance reward or benefit to that line and/or to any or all lines that operate within the same vicinity (for instance the same binder of wires or perhaps the same telephone company region or central office), for example by limiting the maximum data rate of any subject line(s). When the line is in compliance, the reward is provided to the line (and possibly other lines maintained by the service provider, provided that these other lines also are in compliance). The controller may collect operational data, analyze that data and then generate operational instructions to the DSL line to implement embodiments of the present invention. In cases where multiple operational conditions are applied, compliance may be required with all conditions or a minimum subset of conditions for a line to qualify for the beneficial operational reward (which, again, may include benefit(s) to other lines also operated in similar compliance by the service provider). This and other variations on the present invention will be apparent to those skilled in the art after reviewing the present disclosure.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other device. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite G.992.4, ADSL2+ (G.992.5), VDSL1(G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Working Text WT-87 (Rev. 6), entitled "CPE WAN Management Protocol" from the DSL Forum, dated January 2004. Finally, DSL Forum Working Text WT-082v7, entitled "LAN-Side DSL CPE Configuration Specification" from the DSL Forum, dated Jan. 5, 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is unlikely that lines sharing the same binder terminate on the same line card or one that could coordinate the transmissions in ADSL, but such same-line-card binder termination is more feasible in VDSL. However, the discussion of xDSL systems may be extended to ADSL, also, because common termination of same-binder lines might also be achieved (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
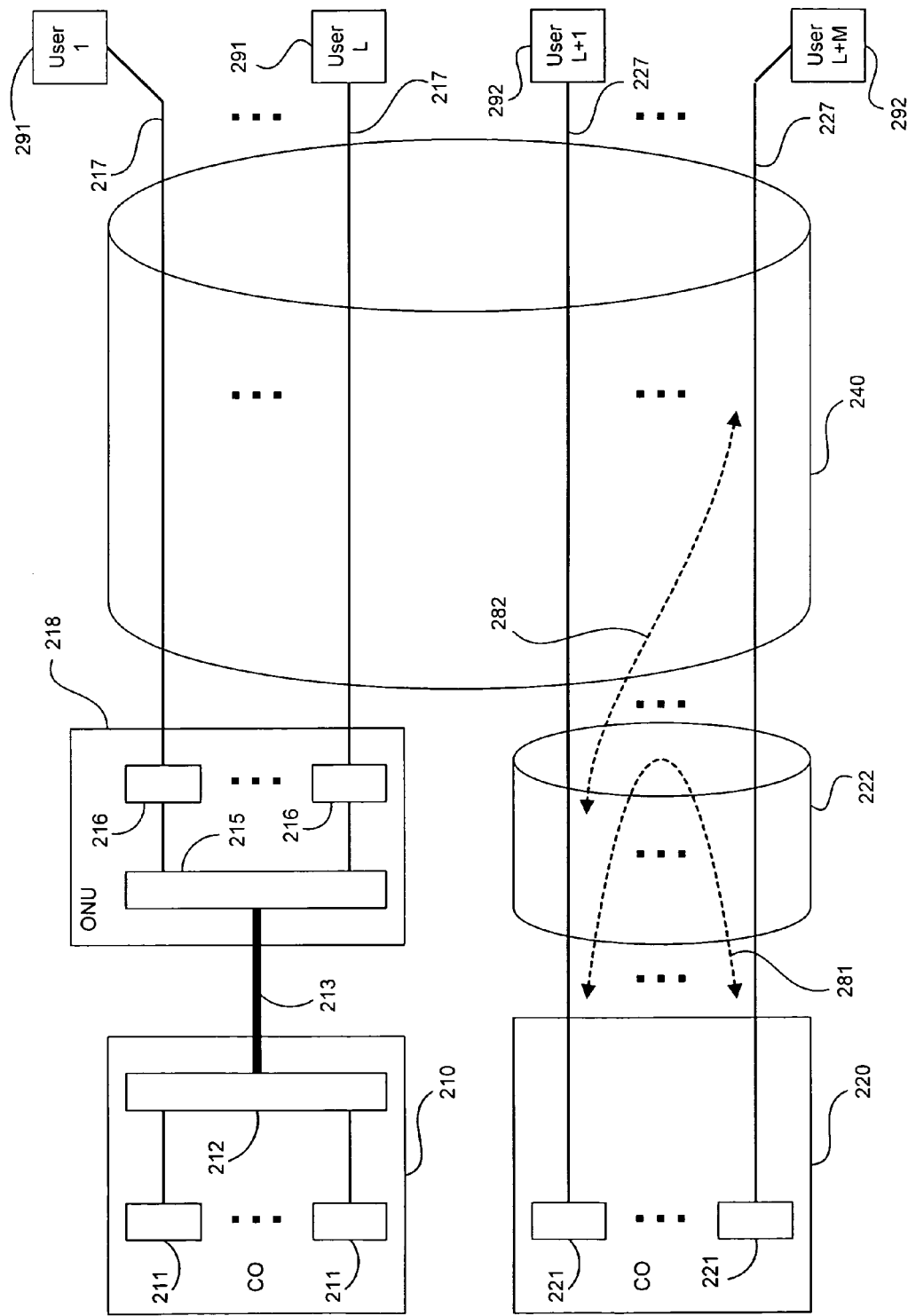
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from an ADSL NMS can be found therein; others may be known to those skilled in the art.

As described in more detail below, a controller such as a DSL optimizer implementing one or more embodiments of the present invention can collect operational data relating to one or more DSL lines, analyze that data, and provide instructions and/or control signals to lines to reduce crosstalk effects and/or otherwise improve performance while reducing or eliminating disruption of DSL service to other DSL lines affected by the DSL environment. One or more embodiments of the present invention can be part of or implemented in or by a controller (for example, a DSL optimizer, dynamic spectrum manager or DSM Center). The controller can be or include a computer, computer-implemented device or combination of devices that collect and analyze appropriate operational data. The controller can be located anywhere. In some embodiments, the controller resides in the DSL CO (central office), while in other cases a transmitter (for example, an ATU-C, DSLAM or other component) may be operated by a third party located outside the CO. The structure, programming and other specific features of a controller usable in connection with embodiments of the present invention will be apparent to those skilled in the art after reviewing the present disclosure.

The following examples of embodiments of the present invention typically use ADSL systems (for example, ADSL1 and ADSL2 systems) as exemplary communication systems. Within these ADSL systems, certain conventions, rules, protocols, etc. may be used to describe operation of the exemplary ADSL system and the information and/or data available from users and/or equipment on the system. However, as will be appreciated by those skilled in the art, embodiments of the present invention may be applied to various communication systems, and the invention is not limited to any particular system. The present invention can be used in any data transmission system in which mitigation of problems to users can be effected by encouraging compliance with one or more operational conditions.

Figure 3A:
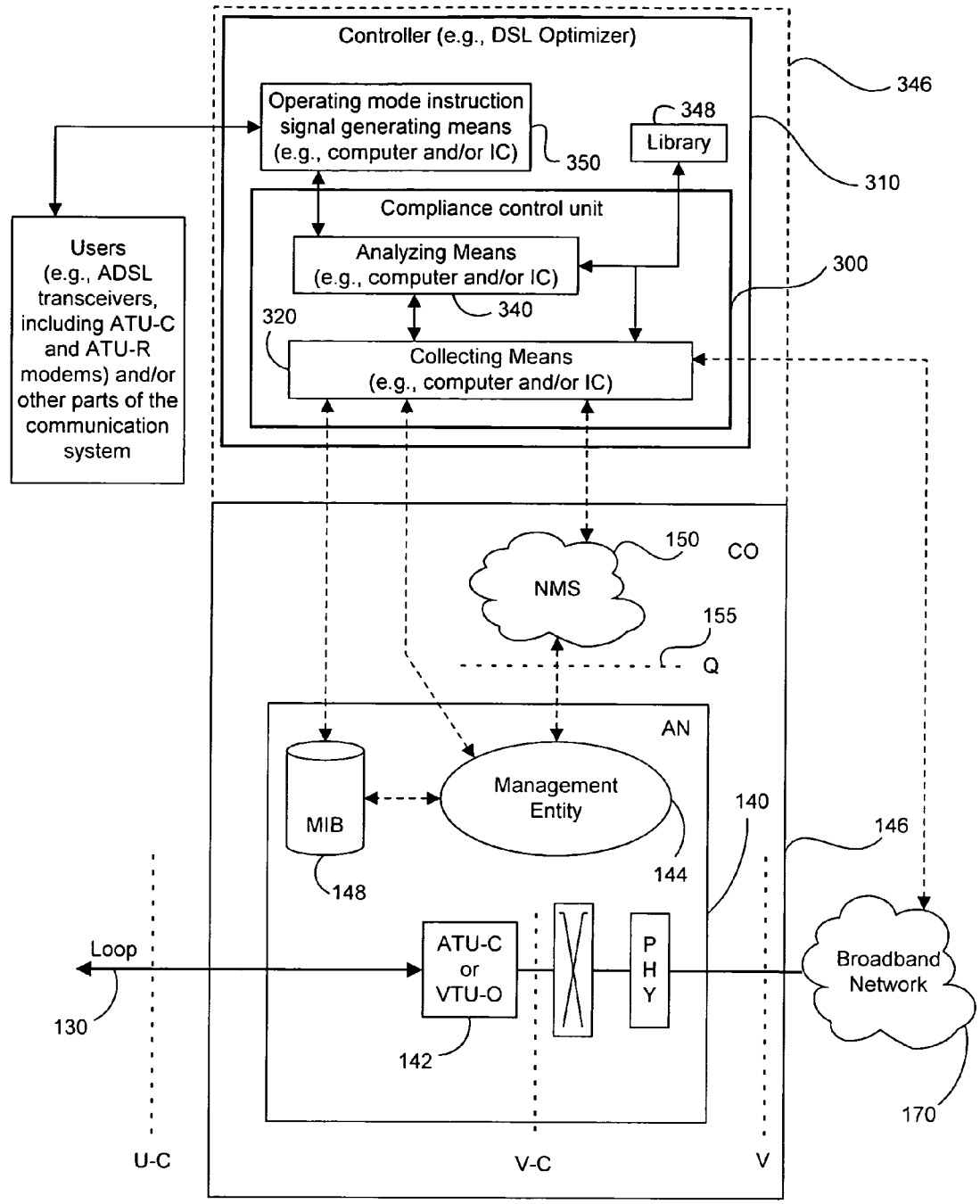
FIG. 3A is a controller including a compliance control unit according to one embodiment of the present invention.

According to one embodiment of the present invention shown in FIG. 3A, a compliance control unit 300 may be part of an independent entity coupled to a DSL system, such as a controller 310 (for example, a DSL optimizer) assisting users and/or one or more system operators or providers in optimizing their use of the system. (A controller or DSL optimizer may also be referred to as a DSM server, dynamic spectrum manager, Dynamic Spectrum Management Center, DSM Center, Spectrum Maintenance Center or SMC.) In some embodiments, the controller 310 may be an independent entity, while in other embodiments the controller 310 can be an ILEC or CLEC operating a number of DSL lines from a CO or other location. As seen from the dashed line 346 in FIG. 3A, the controller 310 may be in the CO 146 or may be external and independent of CO 146 and any company operating within the system. Moreover, controller 310 may be coupled to and/or controlling DSL and/or other communication lines in multiple COs.

Figure 6:
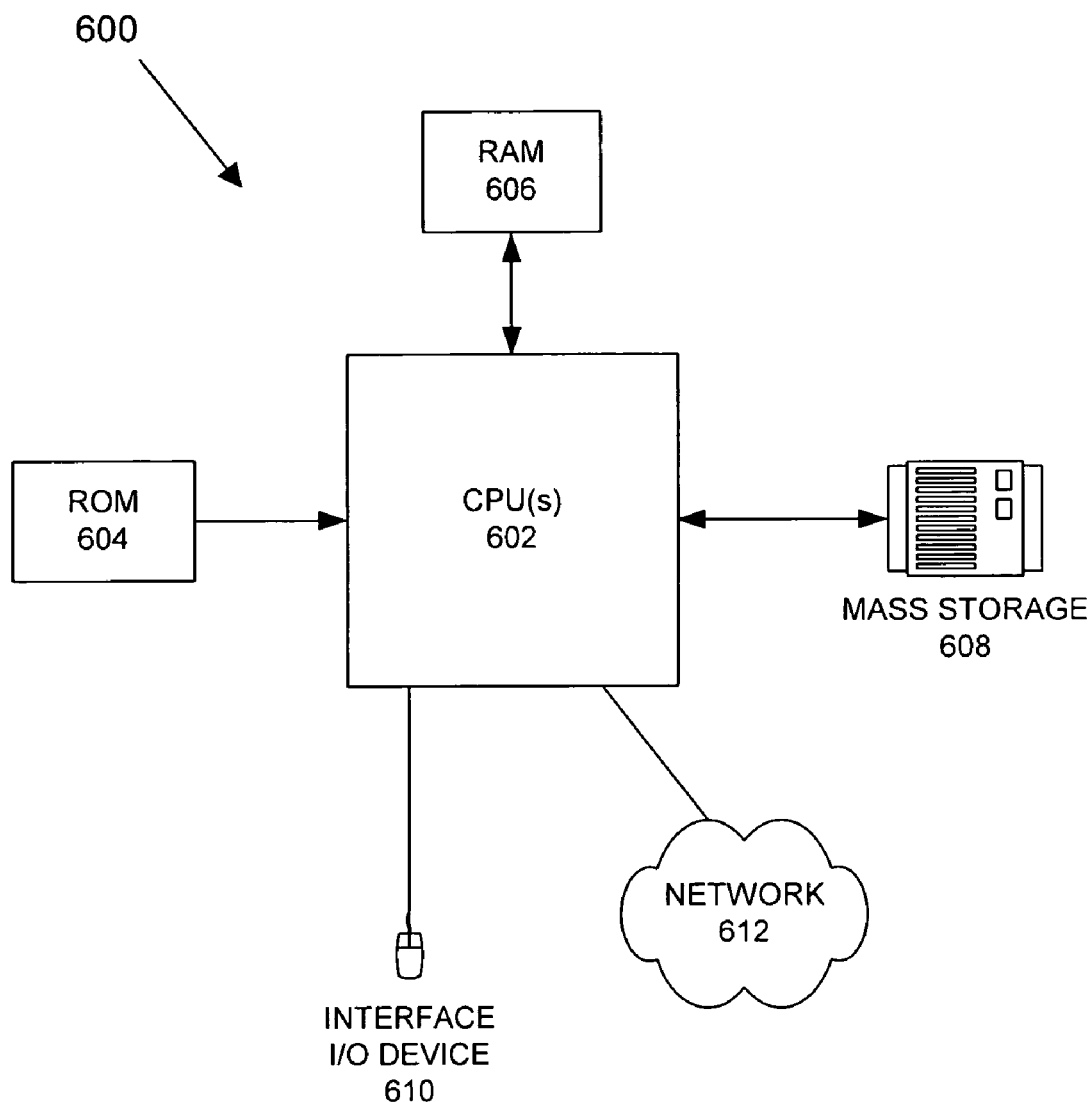
FIG. 6 is a block diagram of a typical computer system or integrated circuit system suitable for implementing embodiments of the present invention, including a computer program product that can implement one or more methods of the present invention.

The compliance control unit 300 includes collecting means 320 (which can be a computer, processor, computer module, etc. of the type generally shown in FIG. 6) and analyzing means 340 (which also can be a computer, processor, computer module, etc. of the type generally shown in FIG. 6). As seen in FIG. 3A, the collecting means 320 may be coupled to NMS 150, ME 144 at AN 140 and/or the MIB 148 maintained by ME 144. Data also may be collected through the broadband network 170 (for example, via the TCP/IP protocol or other protocol or means outside the normal internal data communication within a given DSL system). One or more of these connections allows the compliance control unit to collect operational data from a communication system such as a DSL system. Data may be collected once or over time. In some cases, the collecting means 320 will collect on a periodic basis, though it also can collect data on-demand or any other non-periodic basis (for example, whenever a DSLAM or other component sends data to the compliance control unit), thus allowing the compliance control unit 300 to update its information, operational conditions, rules, sub-rules, etc., if desired. Data collected by means 320 is provided to the analyzing means 340 for analysis and any decision regarding compliance.

In the exemplary system of FIG. 3A, the analyzing means 340 is coupled to an operating signal generating means 350 (which also can be computer, processor, computer module, etc. of the type generally shown in FIG. 6) in the controller 310. This signal generator 350 is configured to generate and send instruction signals to modems and/or other components of the communication system (for example, DSL transceivers and/or other equipment, components, etc. in the system). These instructions may include operational condition values, maximum data rate limits, upstream transmission frequency band limits, compliance instructions or other instructions regarding transmit power levels, coding and latency requirements, etc. The instructions may be generated before or after the controller 310 determines a given line's compliance with any set operational conditions in the communication system.

Embodiments of the present invention can utilize a database, library or other collection of data pertaining to the data collected, decisions made regarding relevant parameters, past decisions regarding compliance with the operational condition(s), etc. This collection of reference data may be stored, for example, as a library 348 in the controller 310 of FIG. 3A and used by the analyzing means 340 and/or collecting means 320.

In some embodiments of the present invention, the compliance control unit 300 may be implemented in a computer such as a PC, workstation or the like. The collecting means 320 and analyzing means 340 may be software modules, hardware modules or a combination of both, as will be appreciated by those skilled in the art. When working with a large numbers of modems, databases may be introduced and used to manage the volume of data collected.

Figure 3B:
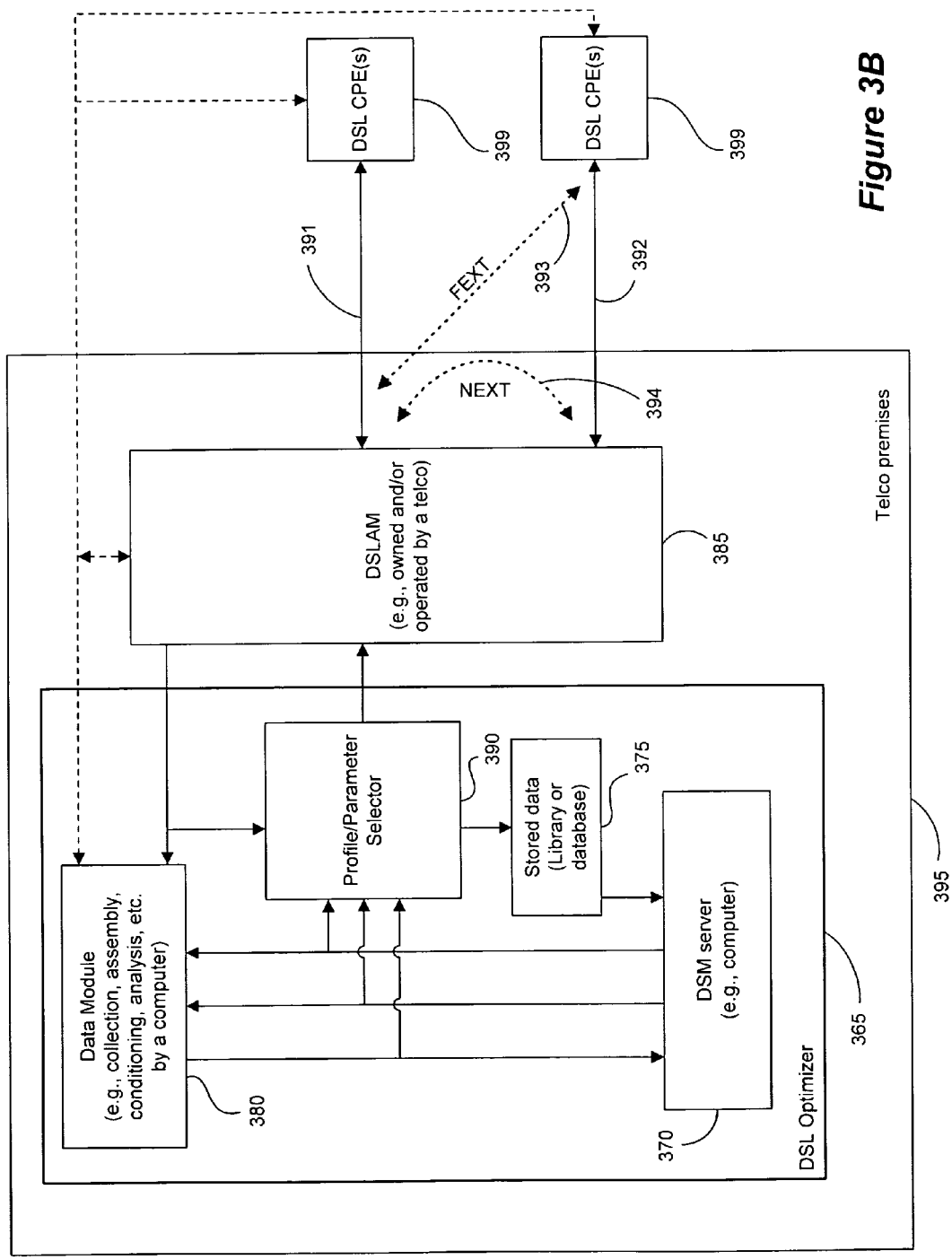
FIG. 3B is a DSL optimizer according to one embodiment of the present invention.

Another embodiment of the present invention is shown in FIG. 3B. A DSL optimizer 365 operates on and/or in connection with a DSLAM 385 or other DSL system component, either or both of which may be on the telco premises 395. The DSL optimizer 365 includes a data module 380, which can collect, assemble, condition, manipulate and supply operational data for and to the DSL optimizer 365. Module 380 can be a computer such as a PC or the like or part of such a computer, either implemented in software, hardware or both. Data from module 380 is supplied to a DSM server 370 (for example, a data analysis module) for analysis (for example, regarding compliance, adjustment of one or more operational conditions, etc.). Module 370 may be part of and/or implemented in the same computer as used for module 380 or may be a separate unit. Information may also be available from a telco database 375.

A profile/parameter selector 390 may be used as an instruction generator to implement profiles (for example, a profile limiting or defining maximum data rates available to various communication lines). Selector 390 also may generate other operating mode instructions for communication system components and users pursuant to embodiments of the present invention. Decisions regarding compliance and adjustments to any operational conditions and operational rewards may be selected under the control of the analysis module 370 or in any other suitable manner, as will be appreciated by those skilled in the art. Profiles and/or other operational controls from selector 390 are implemented in the DSLAM 385 and/or any other appropriate DSL system component equipment. Such equipment is coupled to DSL equipment such as customer premises equipment 399. Data is transmitted on communication lines 391, 392 for users 399. NEXT 394 and/or FEXT 393 may be induced between lines 391, 392 in a manner well known to those skilled in the art. The system of FIG. 3B can operate in ways analogous to the system of FIG. 3A, as will be appreciated by those skilled in the art, though differences are achievable while still using embodiments of the present invention.

Figure 4:
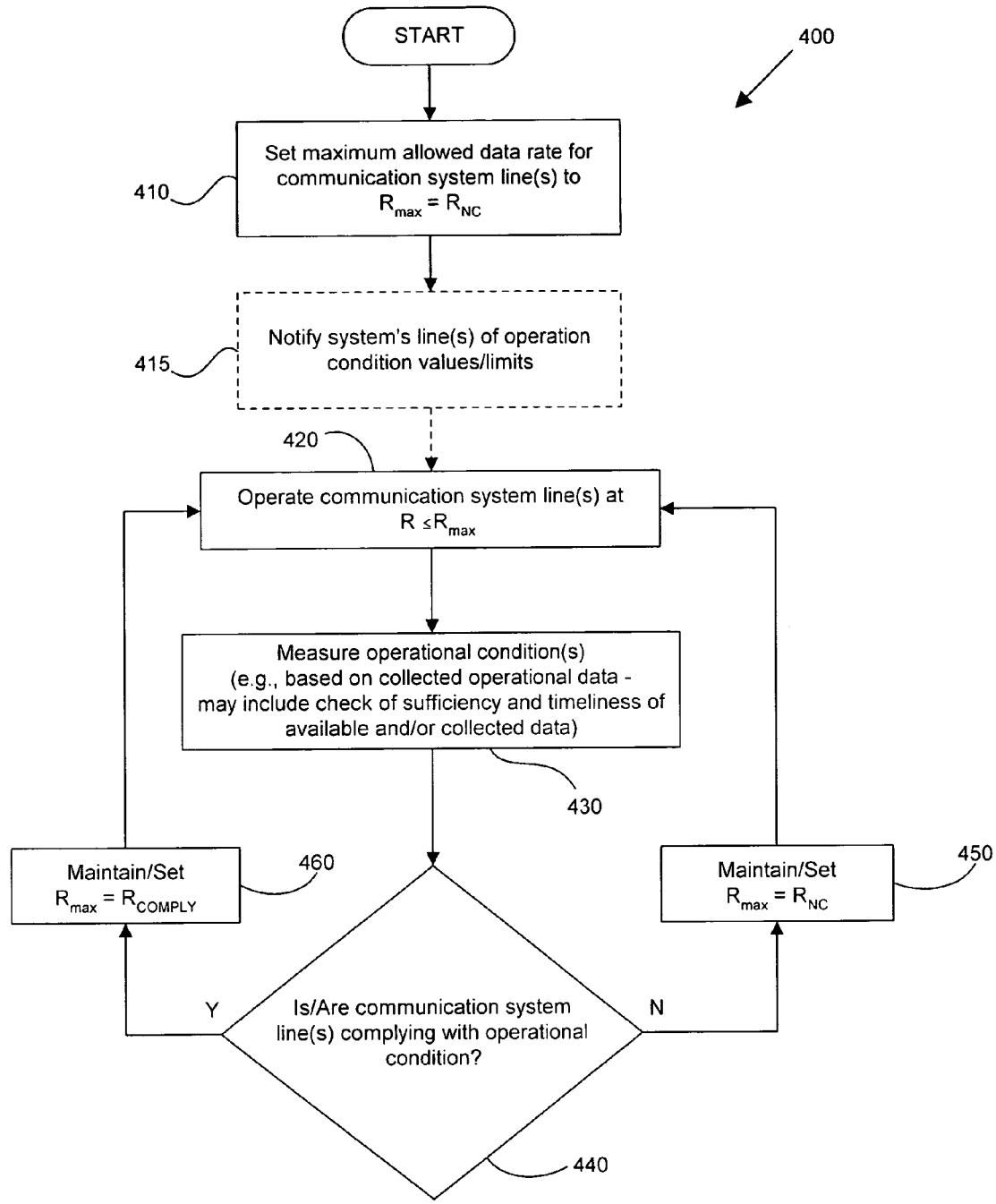
FIG. 4 is a flow diagram of a method according to one embodiment of the present invention.

One embodiment of the present invention is shown in the flow diagram of FIG. 4. Method 400 commences at 410 with setting the maximum allowed data rate, $R_{max}$, for one or more lines in a communication system to a non-compliance level, $R_{NC}$. Any system line(s) participating in the condition/reward incentivization program may then be notified at 415 of the value and/or limits being used to determine compliance with any applicable operational condition(s). The "communication system" can be any type of system (for example, a DSL system) and can include a single line, multiple lines, a binder, a cable, an entire operator's set of lines, all the lines of a single service provider, all the lines in CO or region, etc. The line is operated at 420 using $R_{max}$, transmitting data pursuant to normal operation. At 430 any operational condition(s) used by the line can be measured, for example using collected operational data. Compliance is then evaluated at decision 440. If the line is not in compliance, then $R_{max}$ is maintained at or reset to $R_{NC}$ at 450. If the line is in compliance, then $R_{max}$ is maintained at or increased to $R_{COMPLY}$ at 460. In the alternative, when compliance is detected, $R_{max}$ may merely be released from the $R_{NC}$ limit. Once the rate adjustment is effected at either 450 or 460, the line returns to operation at 420 and may be re-evaluated at a later time. Method 400 and any of the other methods of the present invention can be implemented on a computer program product that includes a machine readable medium and program instructions contained in the machine readable medium. The program instructions specify one or more methods disclosed herein.

The evaluation of whether a line is entitled to an operational benefit or not, and/or any other evaluation of operational data, may be required to be based on the most recently available operational data pertaining to the operational condition or may be based on historical data as well as the current data. If historical data is used, it may be weighted in any suitable manner. For example, a data weighting vector (W) can be given to each line and/or operational condition such that the weighting of current and historical data can be applied as a function of how current the data is. For instance, if the weighting vector is W1=[1 1 1], then the data from the last three update periods (for example, days) are given equal weight in evaluating compliance. If the weighting vector is W2=[1 0 0 0 0 0 0 0.5], then the data from the last reported operational condition data is used with weighting 1 and data from 7 update periods earlier (for example, one week ago) is used with weighting 0.5. Data from other update periods are ignored. If it is desired to use data from only the last 2 months with equal weighting, then the weighting vector can be of size 60 with all ones (that is, W3=[1 1 1 ... 1 1 1]), using an update period of one day. Different weighting vectors can be used for different operational conditions, for example depending on whether a single reading should serve as the basis for making any decision about operational benefits and/or other changes to a line or system according to embodiments of the present invention.

In addition to the timeliness of the operational data considered, the evaluation of whether a line, system, etc. is entitled to any operational benefit, and/or any other evaluation of operational data, may be required to be based on sufficient available operational data. For example, in some cases, the data collection system might malfunction or be inactive, meaning that too little or no data might be available. In such cases, it might be helpful for the system to abstain from making any changes to a system and/or line operation, or any limits and/or parameters applicable thereto, when there is insufficient data on which to base reliable evaluation. To prevent an inappropriate changes from being implemented, implementation of a change can be limited only to those cases when sufficient extra data has been collected since the last evaluation or within a specified time period. Operational data may be viewed using cardinality techniques and data probability distributions. Sophisticated distribution estimation might be used to reduce the influence of distant past values in favor of more recently collected data and are well understood by those skilled in the art. If a data sufficiency or timeliness rule is not satisfied, a line may simply stay in its current state until new data is collected that allows such a rule to be met.

Figure 5:
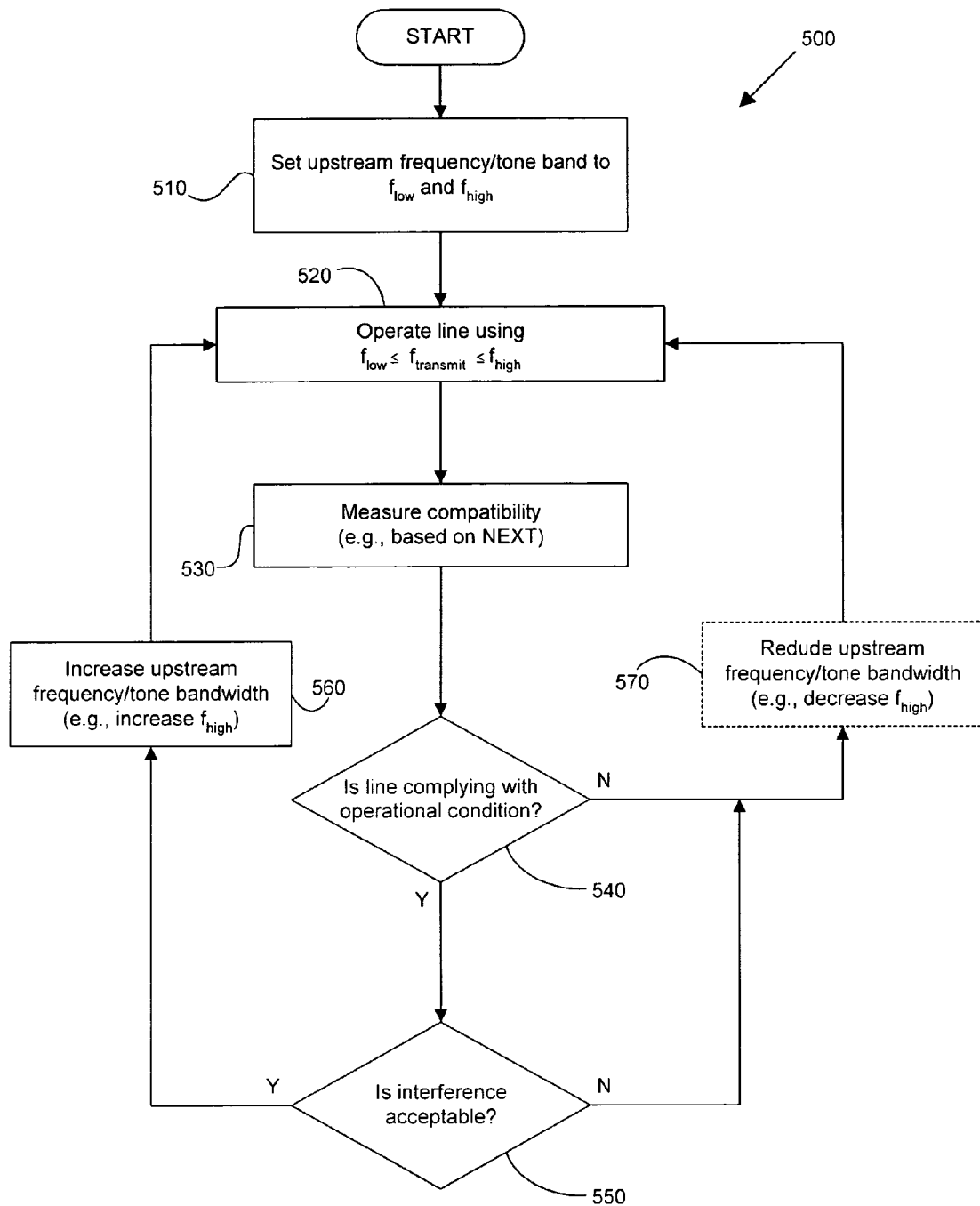
FIG. 5 is a flow diagram of another method according to one embodiment of the present invention.

Another embodiment of the present invention, shown in FIG. 5, uses a slightly different operational reward and adjustment thereto. In method 500, an ADSL line sets it upstream data transmission frequency band to $f_{low} \leq f_{transmit} \leq f_{high}$. The upper cutoff frequency $f_{high}$ is used for upstream transmission and may be selected at an appropriate starting level to minimize crosstalk or achieve any other preferred goal. The line is then operated at 520 using the frequency band in place. Compliance with a given compatibility standard (for example, crosstalk that does not exceed a specified threshold) is measured at 530 and can be based on collected operational data as well. Compliance with one or more operational conditions is determined at 540. If the line is not complying the applicable operational condition(s), then the line continues operating at 520 using the current frequency bandwidth. If the line is complying with the operational condition(s), then the interference level can be evaluated (where interference and any applicable operational condition(s) are distinct) at decision 550. If the interference compatibility of the line's operation is itself the operational condition, then decisions 540 and 550 may be combined into a single step. If the line is in operational-condition compliance and interference levels are not excessive, then the upper limit of the frequency band, $f_{high}$, can be increased at 560. Increase of $f_{high}$ can be made by raising a frequency level, per se, or by increasing the uppermost cutoff frequency in the band. The line then operates using the newly set frequency band at 520. In cases where the upper end of the frequency range is too high, then at 570 $f_{high}$ can be lowered.

In other embodiments of the present invention, a less restrictive PSDMASK can be made available to compliant lines, while a more restrictive PSDMASK is imposed on non-compliant lines. In addition, CARMASK and/or BCAP [n] also can be used in an analogous manner. Also, multiple frequency bands along with the level of power spectral density in any of the bands can be used to determine compliance in some embodiments. Other operational parameters and/or features will be apparent to those skilled in the art. Moreover, multiple levels of rewards that are dependent on multiple compliance levels can be utilized using the present invention.

More specifically, embodiments of the present invention include methods, apparatus and computer program products in which the following examples can be implemented:

EXAMPLE 1

A compliant system may transmit at downstream data rates up to a complying maximum data rate only when the measured maximum margin at all tones for all same-provider DSL services within the same cable do not exceed 11 dB. Compliant modems also may be required to observe appropriate regional power spectral density masks, and the measurement of the maximum margin should apply to all tones within the masks. When a service provider cannot ensure that the maximum margin is ubiquitously used for all its own DSLs within a common region, the maximum data rate should not exceed a non-complying maximum data rate on the services offered in that area and still must adhere to applicable power spectral density masks. Furthermore, the transmitted downstream power of any ADSL service may be limited to not more than 20.5 dBm. In all ADSL2 cases, a programmed PSDMASK represents a maximum power spectral density that should be simultaneously observed. If code violation counts measured over specified intervals (for example, 15 minutes) exceed 250 (or some suitably chosen threshold) at the maximum impulse protection available, then service-provider DSM compliance can be claimed at any maximum margin setting.

EXAMPLE 2

A compliant system may transmit at data rates up to a maximum data rate on loops with measured upstream attenuation meeting a minimum attenuation value (for example, 40 dB or approximately a 13,000 ft loop) and may use up to 20.5 dBm of power, if all DSL lines of the same-provider within the same cable have measured maximum margin within a given limit (for example, 11 dB or less). Compliant modems may use any PSD values between 138 kHz and 500 kHz below a service-provider specified carrier mask, provided the mask does not exceed −28 dBm/Hz at any frequency below 138 kHz and does not exceed −32 dBm/Hz at any frequency above 138 kHz. In any use of this type of long range compliance, any POTS-protection requirements should be satisfied.

EXAMPLE 3

A compliant upstream communication system on lines shorter than a given maximum line length (for example, 9,000 feet or measured upstream attenuation less than 30 dB) may use tones up to tone 63 to transmit at data rates as high as 2.5 Mbps if the measured upstream MAXSNRM does not exceed 11 dB on all tones of all same-provider lines in the same binder. In all such cases, the PSD may not exceed a given lower level. Compliant upstream systems not observing the MAXSNRM of 11 dB may transmit at no upstream data rate greater than 384 kbps.

EXAMPLE 4

A compliant VDSL correctly implements a restricted service-provider-programmed PSDMASK if the MAXSNRM on all tones (that is, band preference on) is the same as or less than 11 dB and the MAXATP≦10 dBm. The restrictions on the PSDMASK are that it must obey applicable PSD constraints in a given frequency range (for example, between 1.1 and 4.4 MHz).

In a system using methods, techniques and apparatus such as those presented above, a DSL line that respects the conditional margin limits, characteristics and/or parameters, will help reduce negative effects on other users' signals caused by crosstalk, excessive power, etc. in the DSL system. The availability of higher data rates and/or other operational rewards incentivizes users to use reasonable margin limits and the like. Those skilled in the art will appreciate that other operational conditions and rewards may be used in various communication systems according to the present invention.

Using techniques, methods and apparatus such as those disclosed herein, DSM efforts can be more than a set of maintenance parameters. DSM also can encompass the spectrum-management standards' ability to discern and adjudicate the compatibility of DSL spectra within a cable. Universal high-speed DSL deployment is more likely if that compatibility specification task is undertaken, for example using embodiments of the present invention, and can be used to determine and encourage faster DSL deployment.

ADSL downstream transmission signals typically have a power-spectrum-density (PSD) limit of −40 dBm/Hz. The actual PSD can be up to 2.5 dB higher but must average to this level. Further, while −40 refers roughly to most of the band, the exact PSD templates can be found for various regions in the annexes of various standards and in the T1.417 spectrum management standard, for instance, for North America (other countries may have documents similar to the T1.417 spectrum management standard). ADSL downstream transmitters may otherwise use up to 20.5 dBm of transmit power. Unfortunately, 20.5 dBm is allowed with the −40 dBm/Hz constraint only when the entire downstream band is active, which only happens occasionally on short loops. Typically, short loops do not need 20.5 dBm of transmit power because maximum attainable data rates often greatly exceed desired rates on these short loops. On the other hand, long loops that often must use the entire 20.5 dBm of transmit power are instead limited to numbers as low as 12-13 dBm because of the −40 dBm/Hz PSD limit. However, as will be appreciated by those skilled in the art, long loops require more power and inappropriate limits on transmit power for these longer DSL loops seriously restrict DSL ubiquity in loop qualification. Embodiments of the present invention can assist in providing more efficient and less troublesome accommodation of these types of variations in loop length and power needs and constraints to effect a better communication system for a variety of users sharing a binder.

An extra 6 dB of transmit power (while still below 20.5 dBm) is roughly 1,000 feet of additional range on almost any long loop. At speeds as low as a few 100 kbps, that 1,000 feet of additional range can dramatically change DSL economics. Thus, prior spectrum management allows and encourages wider-bandwidth, higher-power ADSL downstream transmission on short loops, thereby creating a maximum of crosstalk into already weakened longer loops that create less crosstalk and must transmit at lower power. The ADSL situation is worsened yet if the short loops are on remote-fiber-fed terminals that share a binder with an older longer CO-based ADSL signal. ADSL deployments have been more than 90% of those deployed in North America, emphasizing the extent of the problems created by these practices.

Embodiments of the present invention provide incentive-based spectrum management systems, methods, apparatus and techniques to encourage more considerate use of communication system resources and to discourage practices that can lead to service disruption and/or deterioration for disadvantaged users. In some embodiments, a controller can motivate more widespread correct use of the MAXSNRM parameter, which presently is ignored or incorrectly observed on a very high percentage of the North American DSL base. Other margin-related and/or performance-affecting parameters may likewise be the subject of such techniques. The desired incentivization can be achieved by allowing lines that consistently and/or universally use maximum margin correctly at levels of 11 dB or less to enjoy benefits not available to lines that fail to respect such limits. For example, a line respecting the maximum margin limit can be allowed to transmit at speeds up to 7 Mbps in ADSL1, but limit DSL systems that exhibit excessive margins of 17 dB or more to slower rates of 1.5 Mbps. Thus, service providers and vendors are motivated to mitigate and/or reduce overall crosstalk by correct and widespread use of "parameter-based politeness." As will be appreciated by those skilled in the art, it would be possible to estimate probabilities of decreased service-disruption under this practice. In another embodiment of the present invention, a controller can allow 20.5 dBm transmission on ADSL loops with no PSD constraint if margin<MAXSNRM=11 dB for speeds up to 768 kbps when loop length is greater than 12 kft (for example, when estimated via reported upstream attenuation).

Embodiments of the present invention also may be compatible with symmetric services such as HDSL (or perhaps in the future SHDSL), which may share the same binder as ADSL. One concern that led to the −40 dBm/Hz PSD mask of ADSL is that the downstream ADSL near-end crosstalk (NEXT) into upstream HDSL receivers could harm the HDSL (or SHDSL).

Probability can shed some light on whether a maximum length HDSL shares a binder with a very long length ADSL that needs 20.5 dBm of power (and a PSD of more than −40 dBm/Hz). If HDSL exists on only 2% of the DSL lines and the conditional likelihood of a long ADSL being next to the HDSL in the binder (or cable) is only 10% (because long lines are not very probable), then the probability is 0.02%. Further, the crosstalk between these two lines would also have to be at the 1% worst-case level for the incompatibility to cause service disruption of the HDSL. Moreover, it takes several such long ADSLs all transmitting at maximum power to create the problem (and recall that correct MAXSNRM observance would reduce the power on a majority of the ADSL circuits). Thus, the estimated probability drops to well below 0.000002, or 2 chances in a million (significantly below the probability if all ADSLs transmitted the maximum permissible −40 dBm/Hz at all frequencies as they are allowed to do in the current T1.417 should they so desire for any purpose).

Thus, there is actually a greater probability of incompatibility under prior, far less flexible rules. Whether the rates of perhaps a million long-loop ADSL customers are reduced to save the possibility of an outage on only a handful of HDSLs, or a handful of HDSLs are replaced with fiber circuits, the probability of that reduction/replacement need is greater with the fixed/static spectrum management described above than it would be with incentive-based management according to the present invention. In some of the examples discussed herein, use of reported and/or estimated loop information, such as loop-length and attenuation, as an input to the decision to use 20.5 dBm can lead to significant improvements in DSL service. As will be appreciated by those skilled in the art, use of additional information can reduce the probability of service disruption further.

Furthermore, it is sometimes erroneously stated that service providers do not know the other loops in the binder. In fact, service providers can execute a "loop-make-up report" on any line and discover what other services are within the same binder or cable. These records may be used without regulatory violation if they are published and available to any competitive service provider and pairs are not selected for any DSL service of the incumbent service provider by using these records. The records may also then be correlated with the measured and reported noise/crosstalk in the ADSL systems. It might be very easy to know then where the small number of possibly affected HDSLs are and to replace them with fiber (or perhaps better DSLs that would still function).

Higher upstream data rates usually are appealing, especially for certain applications. ADSL2 standards have annexes J and M that allow a wider upstream bandwidth, and at least theoretically allow the overlap of upstream and downstream. The fear of a wider upstream bandwidth from an ADSL2 modem stems from the resulting increase in NEXT into a downstream ADSL receiver. The cut-off frequencies and bandwidths suggested in the G.992.3/5 annexes postulate certain presumed noise occurrences versus loop length, which are unlikely to apply in most specific situations. Using one or more of the embodiments discussed above, the extra bandwidth available under these standards can be exploited in certain situations.

In another example, collected operational data may show that upstream transmissions for a given line observed a MAX-SNRM of 11 dB and could use a wider upstream transmission band up to tone 64 with no PSD constraint and 13.5 dBm of total upstream transmit power. Most upstream transmissions would then have a PSD lower than the −38 dBm/Hz allowed over the upstream bandwidth (or other values, per appropriate annexes). Only loops near the length limit for the upstream speed attempted would use the full power. The probability that one of these length-limit loops is next to a downstream ADSL does not determine the performance characteristics or operational parameters available. Instead, the upstream cut-off frequency can be programmed and adjusted by a dynamic controller (such as a DSL optimizer) as a function of the reporting ADSL lines until those lines achieve their desired performance level. Clearly this frequency would depend upon the situation and be set dynamically according to a fairly simple procedure. Basically, the upstream speed would be increased only if:

1—No other downstream systems report problems; and/or
2—Future systems have a low probability of service disruption or problems.

This is another example of a dynamic, rather than fixed, reaction that could significantly motivate higher DSL speeds in deployment. Any service provider desiring to operate at higher speeds than presently allowed would need to follow an understood procedure for compliance, according to the present invention.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given herein.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

FIG. 6 illustrates a typical computer system that can be used by a user and/or controller in accordance with one or more embodiments of the present invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). As is well known in the art, primary storage 604 acts to transfer data and instructions uni-directionally to the CPU and primary storage 606 is used typically to transfer data and instructions in a bi-directional manner. Both of these primary storage devices may include any suitable of the computer-readable media described above. A mass storage device 608 also is coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 also is coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 608 or 614 and executed on CPU 602 in conjunction with primary memory 606. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of operating a Digital Subscriber Line (DSL) system comprising:
    setting a condition related to operation of the DSL system, the condition being applicable to each of a plurality of DSL users, each DSL user having a subscriber loop;
    analyzing collected operational data of the DSL system using a hardware device coupled to a memory device containing the collected operational data to determine compliance with the condition;
    withholding a reward from a DSL user that is not complying with the condition; and
    providing the reward to a DSL user that is complying with the condition,
    wherein providing the reward to DSL users complying with the condition comprises operating the subscriber loops of DSL users complying with the condition in accordance with the reward.

2. The method of claim 1, wherein the reward is an operational benefit.

3. The method of claim 2, wherein the operational benefit is selected from:
    a maximum data rate;
    a frequency range;
    multiple frequency ranges;
    a range of tones in a Dynamic Spectrum Management (DSM) system; and
    available transmit power.

4. The method of claim 1, wherein the condition is a maximum noise margin limit which is a maximum margin level for data transmissions in the DSL system, wherein withholding the reward comprises restricting the data rates of users operating above the maximum noise margin limit to a maximum data rate of R and wherein providing the reward comprises allowing users operating below the maximum noise margin limit to transmit at data rates above R.

5. The method of claim 4, wherein the maximum noise margin limit is a window of margin levels having an upper margin limit and a lower margin limit.

6. The method of claim 5, wherein the upper margin limit is 17 dB and the lower margin limit is 11 dB.

7. The method of claim 4, wherein maximum noise margin is measured on all tones used by the users.

8. The method of claim 7, wherein the users are all users supplied with DSL service by the same service provider.

9. The method of claim 4, wherein users will be allowed to transmit at data rates above R only if a power spectral density mask is observed.

10. The method of claim 4, wherein users will be allowed to transmit at data rates above R if the users have code violation (CV) counts exceeding a CV count limit while using maximum impulse protection.

11. The method of claim 1, wherein: withholding the reward
    comprises restricting the data rates of users not complying with the condition to a maximum data rate of R and wherein providing the reward comprises allowing users complying with the condition to transmit at data rates above R.

12. The method of claim 11, wherein the condition is that a user must provide operational data to a controller and accept control signals from the controller.

13. The method of claim 12, wherein the controller is a Dynamic Spectrum Management (DSM) Center.

14. The method of claim 11, wherein the condition related to operation of the DSL system comprises upstream attenuation.

15. The method of claim 1, further comprising controlling a DSL line, wherein the condition comprises an operational condition value for an operational parameter used in connection with operation of the DSL line, wherein withholding the reward comprises restricting operation of the DSL line to a non-compliance mode when operation of the DSL line fails to comply with the operational condition value, and wherein providing the reward comprises permitting operation of the DSL line in a compliance mode when operation of the DSL line complies with the operational condition value.

16. The method of claim 1, wherein the operational condition value is the maximum noise margin limit used for data transmissions on the DSL line.

17. The method of claim 1, wherein the DSL line uses a maximum data rate to limit data transmission speed on the DSL line, and further wherein the noncompliance mode comprises limiting the DSL line maximum data rate to a non-compliance maximum data rate value.

18. The method of claim 1, wherein the DSL line uses a maximum data rate to limit data transmission speed on the DSL line, and further wherein the compliance mode comprises permitting the DSL line maximum data rate to exceed a non-compliance maximum data rate value.

19. The method of claim 1, wherein the DSL line uses an upstream frequency bandwidth having an upper cutoff frequency for upstream data transmission on the DSL line, and further wherein the non-compliance mode comprises limiting the DSL line upper cutoff frequency to a non-compliance frequency cutoff value.

20. The method of claim 1, wherein the DSL line uses an upstream frequency bandwidth having an upper cutoff frequency for upstream data transmission on the DSL line, and further wherein the compliance mode comprises permitting the DSL line upper cutoff frequency to be higher than a non-compliance frequency cutoff value.

21. A controller for a Digital Subscriber Line (DSL) system comprising:
 means for collecting operational data;
 means including a storage device for storing the collected operational data;
 means including a hardware device coupled to the collecting means for analyzing the collected operational data in the storing means; and
 means for setting a condition related to operation of the DSL system, the condition being applicable to each of a plurality of DSL users, each DSL user having a subscriber loop,
 wherein the controller determines whether a DSL user in the DSL system is in compliance with the condition, wherein the controller withholds a reward from the DSL user when the DSL user is not in compliance with the condition, wherein the controller provides the reward to the DSL user when the DSL user is in compliance with the condition by operating the subscriber loops of DSL users complying with the condition in accordance with the reward.

22. The controller of claim 21, wherein the controller is a DSL optimizer.

23. The controller of claim 21, wherein the operational condition is at least one of the following:
 a maximum noise margin limit used in transmitting data on the communication lines;
 code violation (CV) counts on a DSL line;
 DSL line attenuation; and
 power spectral density used in transmitting data on the communication lines.

24. The controller of claim 21, wherein the operational benefit is at least one of the following:
 a maximum data rate;
 total transmit power;
 power spectral density;
 a single frequency range used in transmitting data on the communication lines; and
 a plurality of frequency ranges used in transmitting data on the communication lines.

25. The controller of claim 21, wherein the communication system comprises one of the following:
 a DSL line;
 a plurality of DSL lines;
 a binder comprising a plurality of DSL lines, the DSL lines of a service provider;
 all the DSL lines operating in a region;
 all the DSL lines operating in a Central Office (CO); and
 all the DSL lines operating in a cable.

26. A computer-readable medium having instructions stored thereon that when executed by a computer cause the computer to perform operations comprising:
 setting a condition related to operation of a Digital Subscriber Line (DSL) system, the condition being applicable to a plurality of DSL users, each DSL user having a subscriber loop;
 withholding a reward from a DSL user that is not complying with the condition; and
 providing the reward to a DSL user that is complying with the condition,
 wherein providing the reward to DSL users complying with the condition comprises operating the subscriber loops of DSL users complying with the condition in accordance with the reward.

27. The computer-readable medium of claim 26, wherein the reward is an operational benefit.

28. The computer-readable medium of claim 26, wherein the condition related to operation is at least one of the following;
 maximum noise margin limit used in transmitting data on the communication lines;
 code violation (CV) counts on a DSL line;
 DSL line attenuation; and
 power spectral density used in transmitting data on the communication lines.

29. The computer-readable medium of claim 26, wherein the operational benefit is at least one of the following:
 a maximum data rate;
 total transmit power; power spectral density;
 a single frequency range used in transmitting data on the communication lines; and
 a plurality of frequency ranges used in transmitting data on the communication lines.

* * * * *

UNITED STATES PATENT AND TRADEMARK OFFICE
CERTIFICATE OF CORRECTION

PATENT NO. : 7,606,350 B2 Page 1 of 1
APPLICATION NO. : 11/122428
DATED : October 20, 2009
INVENTOR(S) : Cioffi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Twelfth Day of October, 2010

David J. Kappos
*Director of the United States Patent and Trademark Office*